US007148901B2

(12) United States Patent
Belmon et al.

(10) Patent No.: US 7,148,901 B2
(45) Date of Patent: Dec. 12, 2006

(54) METHOD AND DEVICE FOR RENDERING AN IMAGE FOR A STAGGERED COLOR GRAPHICS DISPLAY

(75) Inventors: Stephane G. Belmon, San Diego, CA (US); Patrick J. Chase, San Diego, CA (US); Curtis J. Behrend, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 73 days.

(21) Appl. No.: 10/848,915

(22) Filed: May 19, 2004

(65) Prior Publication Data

US 2005/0259114 A1 Nov. 24, 2005

(51) Int. Cl.
*G09G 5/02* (2006.01)
*G06K 5/00* (2006.01)
*G06K 9/00* (2006.01)

(52) U.S. Cl. ...................... 345/589; 345/586; 345/596; 345/428; 382/162

(58) Field of Classification Search ................ 345/418, 345/428, 581, 586, 589, 596, 597, 613, 614–616, 345/618–619, 639; 382/162–167, 267, 274, 382/276, 282; 358/1.8, 515, 518, 538
See application file for complete search history.

(56) References Cited

U.S. PATENT DOCUMENTS 6,219,025 B1 * 4/2001 Hill et al. .................... 345/589
6,393,145 B1 5/2002 Betrisey et al.
6,542,161 B1 4/2003 Koyama et al.
6,549,682 B1 4/2003 Okada
6,556,724 B1 4/2003 Chang et al.
6,559,858 B1 5/2003 Schneider et al.
6,563,502 B1 5/2003 Dowling et al.
6,583,774 B1 * 6/2003 Yoshida et al. ............... 345/55
6,587,120 B1 7/2003 Kasai et al.
6,628,260 B1 9/2003 Furuhashi et al.
2002/0008713 A1 1/2002 Toji et al.
2002/0008714 A1 1/2002 Tezuka et al.
2002/0054048 A1 5/2002 Nah et al.
2002/0140713 A1 10/2002 Klompenhouwer et al.
2002/0160805 A1 10/2002 Laitinen et al.
2002/0180768 A1 12/2002 Lam
2003/0071832 A1 4/2003 Branson
2003/0076340 A1 4/2003 Hatori et al.
2003/0085906 A1 5/2003 Elliott et al.
2003/0085912 A1 5/2003 Soo et al.
2003/0103058 A1 6/2003 Elliott et al.
2003/0128225 A1 7/2003 Credelle et al.
2003/0197707 A1 10/2003 Dawson

OTHER PUBLICATIONS

Sub-Pixel Font Rendering Technology, printed from website http://grc.com/cleartype.htm on May 19, 2004, 37 pages.

* cited by examiner

*Primary Examiner*—Wesner Sajous

(57) ABSTRACT

A method for rendering an image for a staggered color graphics display comprises calculating first and second color values for each pixel or dot. The first color value is based on a portion of the image corresponding to a first dot, and the second color value is based on a portion of the image corresponding to at least one dot adjacent to the first dot. The method further includes calculating a rendered value from the first and second color values for display in the first dot.

14 Claims, 5 Drawing Sheets

METHOD AND DEVICE FOR RENDERING AN IMAGE FOR A STAGGERED COLOR GRAPHICS DISPLAY

BACKGROUND

Color graphics displays (CGDs) have become commonplace in many type of small portable electronics devices such as digital cameras, video cameras, portable printing stations, and the like. CGDs are also becoming more common in non-portable devices such as ATM machines, in-flight entertainment systems, automobiles, test equipment, printers and multi-function printers, and so on. The CGDs used in many of these applications are liquid crystal displays (LCDs) comprising rectangular arrays (see FIG. 3) of red (R), green (G) and blue (B) dots in which every row is shifted 1.5 dots in a staggered arrangement (see FIG. 4). In some cases, the dots are grouped in triads of red, green and blue dots to form the pixels (see FIG. 1). When pixels are formed by triads of dots, a CGD with a 480×234 dots staggered display area is treated as a 320×117 pixel display because each pixel (or triad of dots) requires an average of 1.5 dots along each row and 2 dots along each column. This grouping of red, green and blue dots into triads can result in "jaggies" that reduce the quality of images and text displayed on the screen.

SUMMARY

According to one exemplary embodiment, a method for rendering an image for a staggered color graphics display comprises calculating first and second color values for each pixel or dot. The first color value is based on a portion of the image corresponding to a first dot, and the second color value is based on a portion of the image corresponding to at least one dot adjacent to the first dot. The method further includes calculating a rendered value from the first and second color values for display in the first dot.

DETAILED DESCRIPTION OF EXAMPLE EMBODIMENTS

In the following detailed description of example embodiments, numerous specific details are set forth in order to provide a thorough understanding of the present invention. However, it will be appreciated by persons skilled in the art that the present invention may be practiced without these specific details. In other instances, well known methods, procedures, components and circuits have not been described in detail so as not to unnecessarily obscure aspects of the example embodiments. While the following detailed description of the example embodiments is provided in the context of color displays, it will be appreciated that the present invention is also applicable to monochrome displays.

Figure 2:
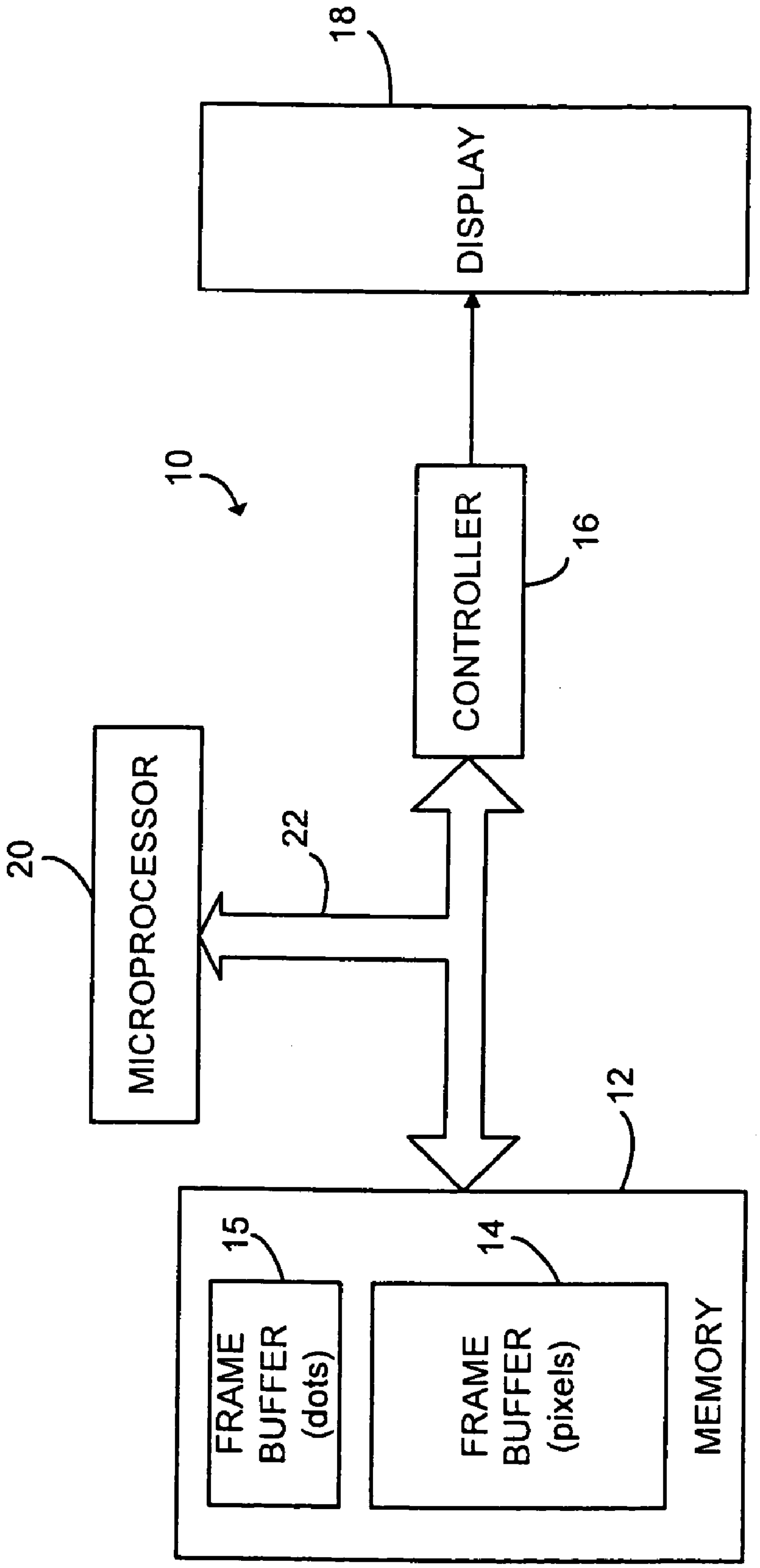
FIG. 2 shows an example of a display device that may be utilized in accordance with an embodiment of the present invention.

FIG. 2 illustrates an embodiment of a display device 10 to which the present invention may be applied. Display device 10 includes a memory 12, a pair of frame buffers 14 and 15 formed in memory 12, a controller 16, and a color graphics display (CGD) 18. Display device 10 further includes a microprocessor 20 coupled to an address/data bus 22, which also interconnects memory 12 and controller 16. The rendering of images for display on display 18 may be performed by microprocessor 12 and/or by controller 16.

Each frame buffer 14, 15 stores a full screen image (or picture) for display on display 18, with the primary difference being that buffer 14 stores a pixel representation of the image and buffer 15 stores a dot representation of the image. Thus, pixel frame buffer 14 may be approximately three times the size of dot frame buffer 15 for reasons that will become clear below.

Display 18 may be any type of color graphics display that includes a staggered array of dots that are individually addressable. According to an exemplary embodiment, display 18 may be a liquid-crystal-display (LCD) such as a thin-film-transistor (TFT) display. However, display 18 could another type of LCD (e.g., diode matrix or another capacitively driven LCD), a digital micro-mirror display, a plasma display, a digital micro-mirror display, an interferometric display, or any other type of color display that includes a staggered array of individually addressable dots.

Figure 3:
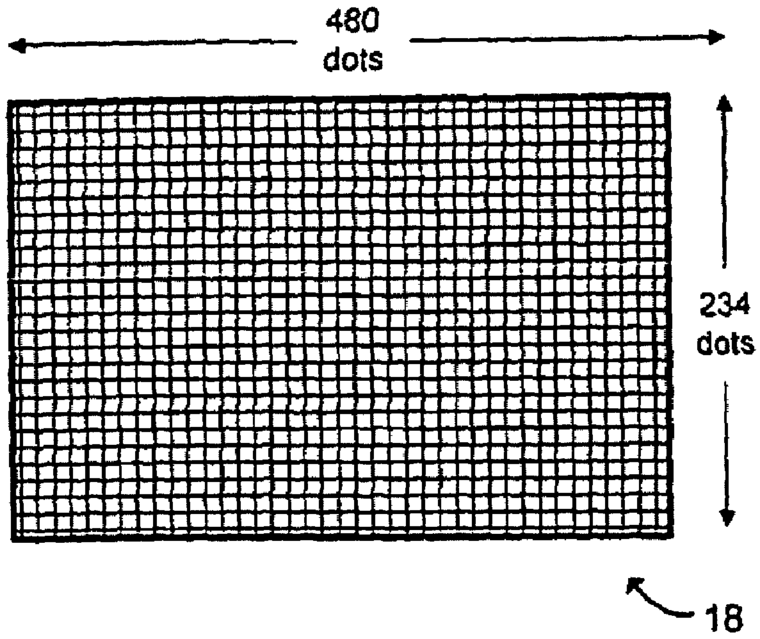
FIG. 3 shows an example of a display including a 480×234 dots staggered display area that may be utilized in accordance with an embodiment of the present invention.

Referring now to FIG. 3, display 18 is shown as a rectangular array of dots arranged in rows and columns. A dot is the smallest display element in display 18 that may be individually addressed and controlled to display images and text stored in frame buffers 14 and 15. In the illustrated embodiment, for example, display 18 includes 480 columns of dots and 234 rows of dots (i.e., display 18 has a 480×234 dot display area). In other embodiments, display 18 may have other screen resolution sizes such as 640×480, 800×600, 1024×768, 1152×864, 1280×1024, 1600×1200, and 2048×1536 dots display areas.

In addition to screen resolution size, display 18 may also be characterized by color depth. One common measure of color depth is the maximum number of color levels (or intensities) that may be displayed in each dot during each frame. According to an exemplary embodiment, 5-bits or 8-bits of intensity information may be stored in pixel buffer 15 for each primary color (e.g., red, green and blue) to provide 32 or 256 different intensity levels (i.e., 15 or 24 bit color) for each dot per frame, respectively, on display 18. If desired, display 18 may be configured to provide other color depths using appropriate software and/or hardware.

Figure 4:
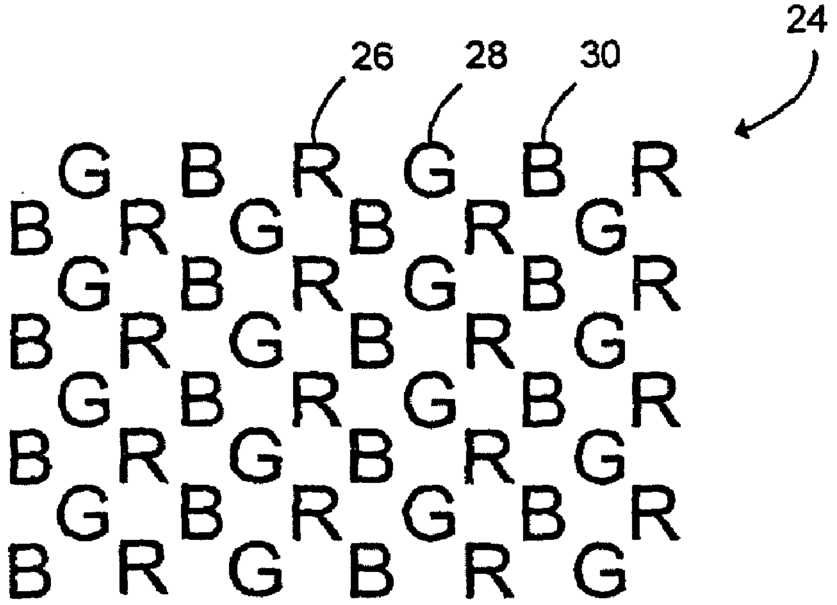
FIG. 4 is an enlarged view of a group of dots in the display of FIG. 3.

Turning now to FIG. 4, an enlarged view of a group 24 of dots in display 18 is shown in accordance with an exemplary embodiment. In this embodiment, each individual dot in group 24 is capable of displaying only one primary color: red (R), green (G), and blue (B). In the top row, for example, dots 26, 28 and 30 are capable of displaying the primary colors of red, green and blue, respectively. This sequence of primary colors repeats across the remainder of the top row. In the next row down (i.e., the second row from the top), the same sequence of RGB appears in consecutive dots from left to right; however, the colors of the dots in this row are shifted 1.5 dots relative to the top row and the following row. This pattern of shifted dot colors repeats for all subsequent rows, which results in all even numbered rows being identical and all odd numbered rows being identical. When a display is configured in this manner, it may be referred to as a staggered RGB LCD display. By contrast, displays that lack this staggered arrangement may be referred to as stripe (e.g., vertical stripe or horizontal stripe) LCDs. Instead of RGB ordering, the color sequencing in display 18 may be reversed, i.e., the color ordering could be blue, green, red (or BGR). As another alternative, the three subtractive primary colors of cyan (C), magenta (M) and yellow (Y) could be used instead of red, green and blue.

According to an exemplary embodiment, each individual dot in display 18 is capable of displaying $2^n$ different intensity levels during each frame, where n is typically an integer between 1 and 8 but may be as high as 10 or 12 or even higher. In displays where each color dot is capable of assuming only two states (i.e., on/off control only), the $2^n$ different intensity levels for each dot may be achieved using n subframes per frame using pulse width modulation or a comparable scheme. Other methods and techniques for modulating the intensity of each dot are known and could be utilized depending on the CGD that is used and other factors.

According to an exemplary embodiment, a sub-pixel rendering technique may be utilized to significantly reduce "jaggies" in images and improve the clarify of text. In particular, a rendered color level of each dot may be computed based on a weighted (or scaled) function of the color/intensity levels (stored in pixel buffer 14) for the pixel under consideration and adjacent pixels. The rendered color levels may then be stored in dot buffer 15 for display on display 18.

Figure 5:
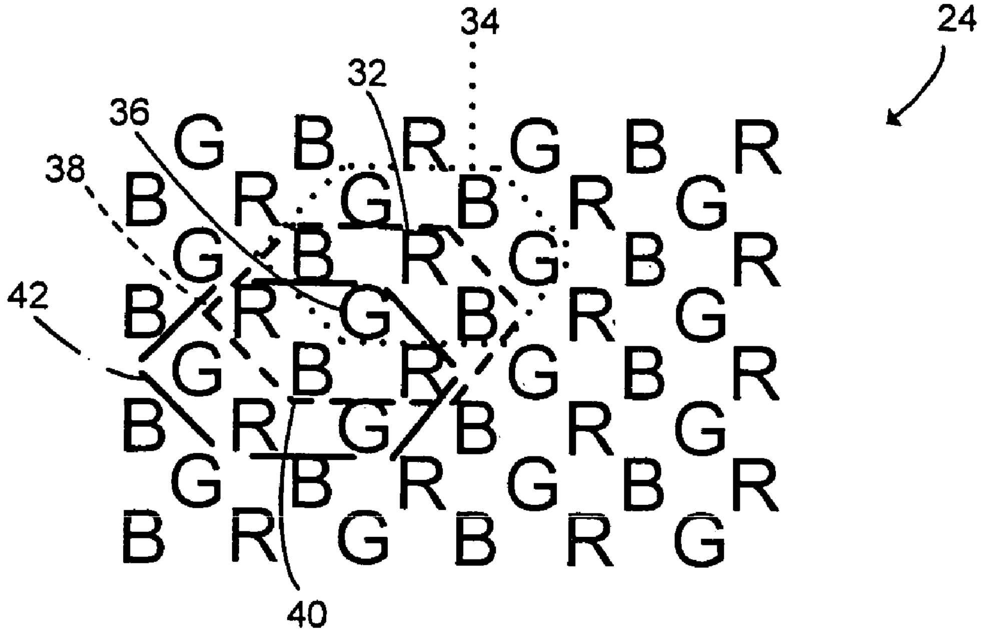
FIG. 5 is an example showing the group of dots of FIG. 4 configured for calculating the color level of a blue, green and red dot based on a weighted (or scaled) function of the color/intensity levels for the pixel under consideration and adjacent pixels.

Further details of an exemplary embodiment of such a sub-pixel rendering scheme are presented in connection with FIG. 5. In this embodiment, the weighting function may be used to render the values in dot frame buffer 15 from pixel frame buffer 14. One example of a weighting function that may be used can be expressed as follows:

$$D_{ij}=X*P_{ij,c}+Y*(P_{i-1j-1,c}+P_{i-1j,c}+P_{ij-1,c}+P_{ij+1,c}+P_{i+1j-1,c}+P_{i+1j,c}) \quad (1)$$

where $D_{ij}$ is the rendered value for a dot of primary color c at row i and column j in display 18, $P_{ij,color}$ is a color value (stored in buffer 14) for primary color c at position i and j, $P_{i-1j-1,color}$, $P_{i-1j,color}$, $P_{ij-1,color}$, $P_{ij+1,color}$, $P_{i+1j-1,color}$, and $P_{i+1j,color}$ are the color values (stored in buffer 14) in the image for pixels adjacent to the pixel at position i and j, and X and Y are weighting coefficients as described below.

Using expression (1) above, the intensity value of a red dot 32 in group 24 may be computed as: X*(R-value of pixel 32)+Y*(sum of the R-values of the six immediately adjacent pixels enclosed by a hexagon 34). Similarly, the intensity value of a green dot 36 in group 24 may be computed as: X*(G-value of pixel 36)+Y*(sum of the G-values of the six immediately adjacent pixels enclosed by a hexagon 38); and the intensity value of a blue dot 40 in group 24 may be computed as: X*(B-value of pixel 40)+Y*(sum of the B-values of the six immediately adjacent pixels enclosed by a hexagon 42). The calculated intensity values for each dot 32, 36 and 40 may be stored in dot buffer 15 as described above for display on display 18. Similar calculations may be performed for the remaining dots in group 24 and any other dots in display 18.

By way of example, the values of the weighting coefficients X and Y may be selected from the following combinations:

TABLE 1

| X | Y |
|---|---|
| 1 | 0 |
| 1/3 | 1/9 |
| 1/7 | 1/7 |
| 1/4 | 1/8 |

The exemplary pairs of coefficients in Table 1 may be used to provide differing degrees of fringing and blurriness in the dot representation of the image stored in buffer 15 and displayed on display 18. For situations where the hexagon of neighboring dots is symmetrical (i.e., the hexagon enclosing adjacent dots is about as tall as it is wide), it has been found that X and Y coefficients of ⅓ and ⅑ (and approximations thereto) may provide an optimal color balance with respect to a simple model of the eye that ignores the different sensitivities to the primaries. In situations where the hexagon is not symmetrical, it may be desirable to apply a more complex weighting function than described above to take into account the varying distances of the adjacent dots. Again referring to the weighting function set forth above, the use of X and Y coefficients of 1 and 0 provides readily visible fringes, but no blurriness. By contrast, the use of X and Y coefficients of ⅐ and ⅐ provides a somewhat blurry image, but no fringing.

In addition to the example values for coefficients X and Y provided in Table 1, other values and approximations to the sample values provided above may be used such as 21/64 and 7/64, as in the sample source code listing in the Appendix. If desired, the X and Y coefficients may also be expressed as percentages rather than ratios. For example, X and Y coefficients of about 30% and about 70% (=100%−30%), respectively, would provide close to an optimal color balance for an array of staggered dots that are approximately symmetrical (i.e., the vertical and horizontal spacing between the dots are about equal).

The exemplary combinations of X and Y weighting coefficients provided in Table 1 share the common characteristic that they all preserve the intensity levels when solid color images stored in pixel buffer 14 are rendered to dot buffer 15 and displayed on display 18. Moreover, all of the weighting coefficients in Table 1 provide appropriate scaling to prevent the maximum color value of a particular dot from being exceeded when an image comprising a full-intensity primary color the same as the dot covers the dot and all of its adjacent neighbors.

Figure 6:
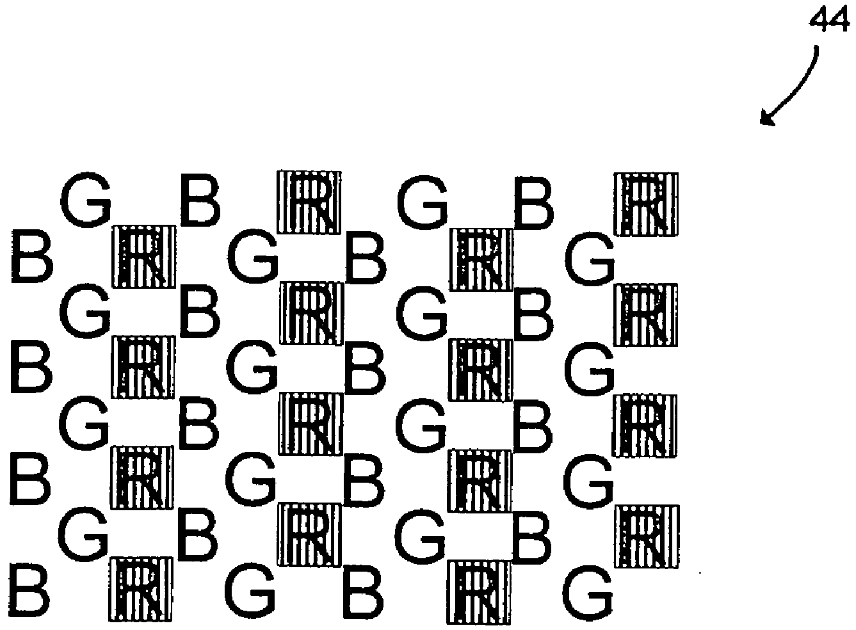
FIG. 6 is an example showing the group of dots of FIG. 4 configured for displaying a solid full-intensity red.

The following example provided in connection with FIG. 6 will help make the above-described characteristics of the coefficient values in Table 1 more clear. In this example, pixel frame buffer 14 (see FIG. 2) contains an image comprising a full-intensity red color for all pixels corresponding to a group of dots 44. Using an 8-bit color representation, the full-intensity red color corresponds to a value of 255 for all of the red dots, a value of 0 for all of the green dots, and a value of 0 for all of the blue dots. Using the expression (1) above with X and Y coefficients of ⅓ and ⅙, respectively, the value of each red dot is computed as 255 (=⅓*255+⅙*(255+255+255+255+255+255)), which is stored in dot buffer 15. Thus, the maximum color value of each red dot (i.e., 255 in this example) is not exceeded despite that the image stored in pixel frame buffer 14 includes a full-intensity red color (i.e., 255) not only on the red dots in group 44 but also on the blue dots and the green dots. Applying the same weighting formula and coefficients as discussed above to the green and blue dots provides a value of 0 (=⅓*0+⅙*(0 0+0+0+0+0+0), which is stored in dot buffer 15. Thus, the foregoing calculations provide a dot representation of the image that is as accurate as possible given the limitations of the display (i.e., all of the red pixels in frame buffer 15 are full intensity red).

Figure 1:
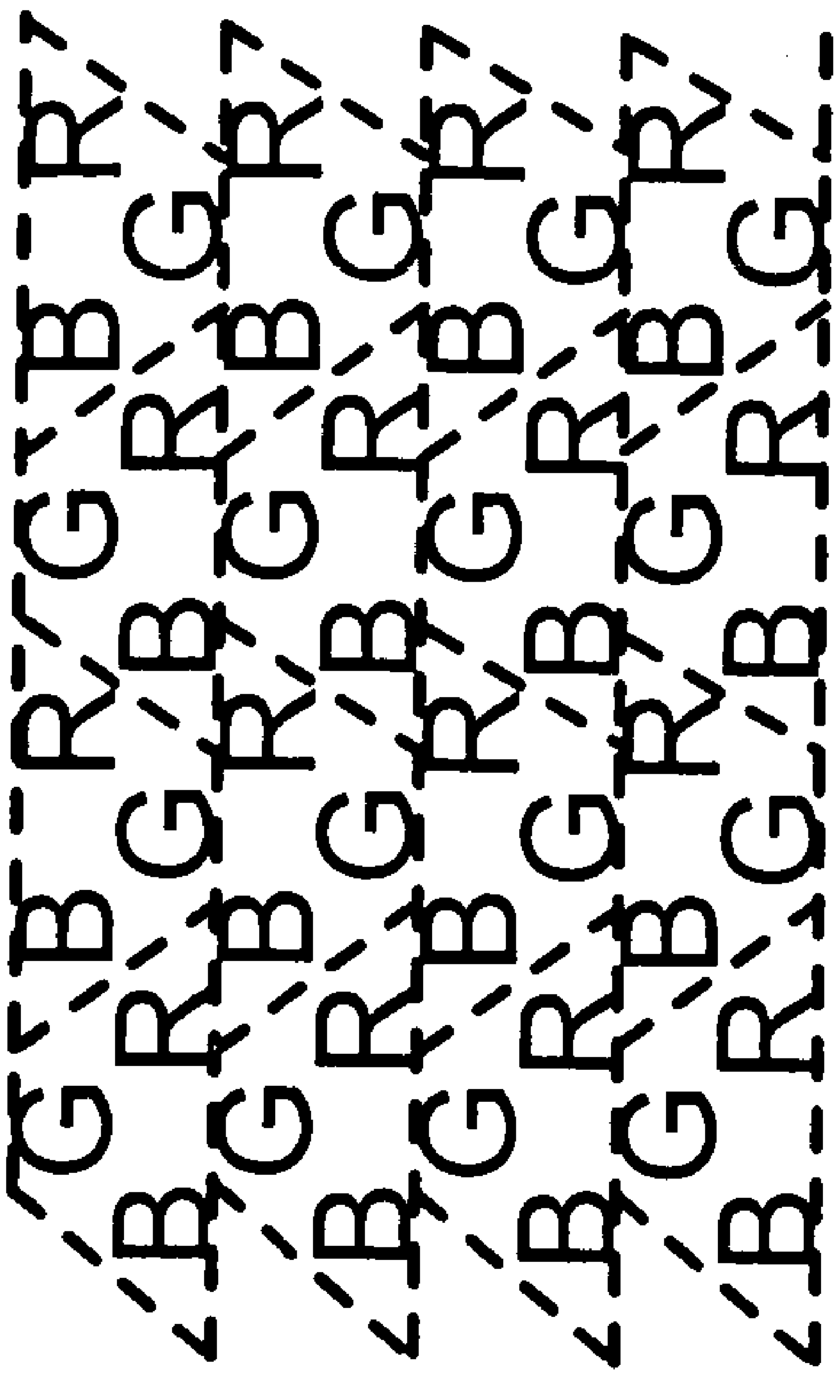
FIGURE 1 (PRIOR ART)
FIG. 1 (PRIOR ART) shows an example of a known arrangement for grouping dots into triads to form pixels in a display device.

As explained above, a weighting function such as provided above and associated coefficients can be used to provide substantially improved rendering of color images and text than was heretofore possible using the triad arrangement of FIG. 1 (PRIOR ART). This is because each individual dot (although physically capable of displaying only one color) in display 18 is effectively treated as a separate pixel capable of displaying all three primary colors until the final rendering step (i.e., calculation of the values in dot frame buffer 15). During the final rendering step, if the image stored in pixel frame buffer 14 includes a color value for a particular pixel that cannot be displayed on the associated dot due to incompatibility (e.g., a green dot cannot display a blue color value), a portion of that undisplayable "energy" is transmitted via the foregoing weighting function to the three neighboring (i.e., immediately adjoining) dots that are capable of displaying that color. This technique results in substantially improved graphics and text, particularly when rendered on low resolution and/or small color graphics displays as are commonly used on many small portable electronics.

Figure 7:
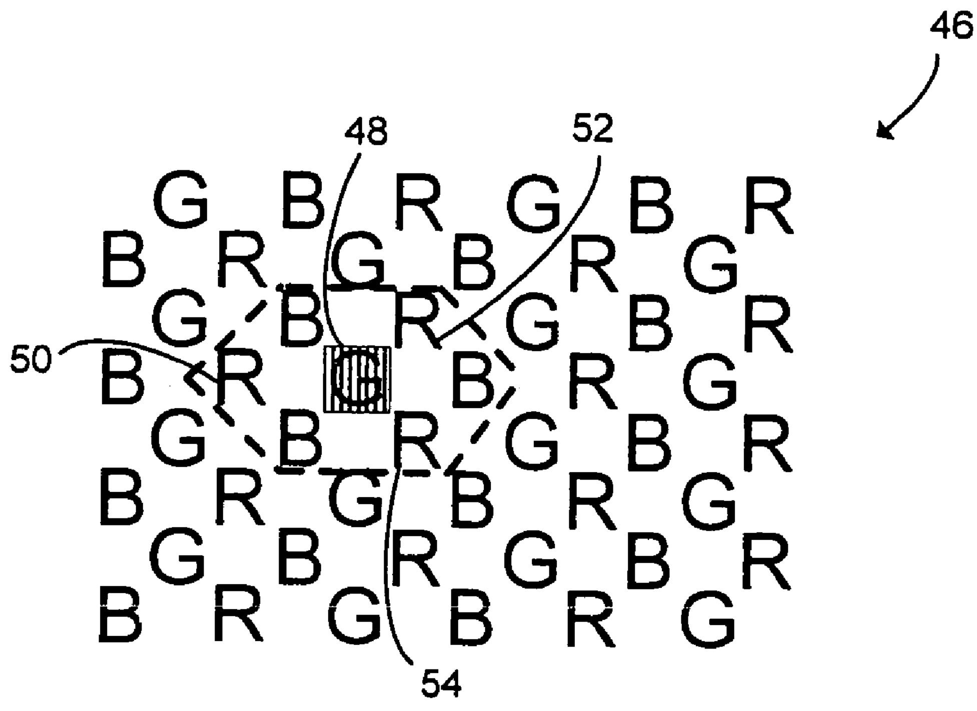
FIG. 7 is an example showing the group of dots of FIG. 4 with an image to be rendered including a full-intensity red color superimposed on a green pixel.
Figure 8:
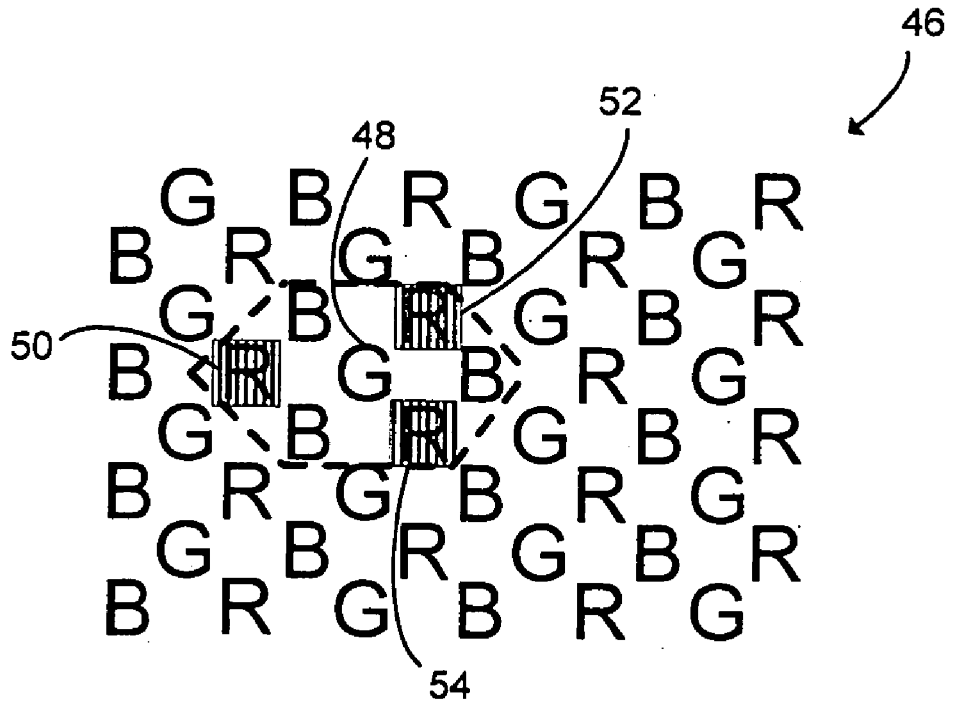
FIG. 8 is a view of the group of pixels in FIG. 7 with the full-intensity red color distributed from the green pixel to the three surrounding red pixels.

Further evidence of the dramatic improvements provided by the above-described sub-pixel rendering techniques for staggered color displays are explained in connection with FIGS. 7 and 8. In FIG. 7, an image stored in pixel frame buffer 14 for a group of pixels or dots 46 in display 18 includes a full-intensity red (i.e., 255 for 8-bit color) color at a location corresponding to a green dot (or pixel) 48. In frame buffer 14, the remaining pixels corresponding to group 46 are black (i.e., red, green and blue are all 0) for simplicity. Of course, this image cannot be directly displayed in pixel group 46 because dot 48 is incapable of displaying red, i.e., dot 48 can only display shades of green. However, the foregoing weighting function automatically transmits a portion of the undisplayable red "energy" at green pixel 48 to the three immediately adjacent red dots 50, 52 and 54 (see FIG. 8), which are capable of displaying shades of red. Using the above-described weighting function and X and Y coefficients of ⅓ and ⅙, respectively, the value of each red dot 50, 52 and 54 is computed as 28.33 (=⅓*0+⅙*(0+0+255+0+0+0). Thus the three red dots 50, 52 and 54 cumulatively display a red intensity value of 85 (=28.33+28.33+28.33), which is approximately centered at green dot 48.

As explained above, it may be desirable to utilize a more complex weighting function than expression (1) above in some circumstances. For example, a more complex weighting function that may be used can be expressed as follows:

$$D_{ij} = X_{ij} * P_{ij,color} + Y_{i-1,j-1} * P_{i-1j-1,color} + Y_{i-1,j} * P_{i-1j,color} + Y_{i,j-1} * P_{ij-1,color} + Y_{i,j+1} * P_{ij+1,color} + Y_{i+1,j-1} * P_{i+1j-1,color} + Y_{i+1,j} * P_{i+1j,color} \quad (2)$$

where $X_{ij}$ is the weighting coefficient for the pixel centered at row i and column j and $Y_{i-1,j-1}$, $Y_{i-1,j}$, $Y_{i,j-1}$, $Y_{i,j+1}$, $Y_{i+1,j-1}$ and $Y_{i+1,j}$ are the Y coefficients for the six immediately adjacent pixels. When expression (2) is utilized with $X_{ij}$ set to ⅓ and all of the Y coefficients set to ⅙, expression (2) reduces to expression (1) with the X and Y coefficients set to ⅓ and ⅙, respectively.

In the foregoing example, the quality of images and text is dramatically improved. The improved image quality of text allows smaller text to be used that remains readable. Moreover, the graphics have significantly reduced jaggies, especially along almost horizontal lines. As a result of these improvements, it may also be possible to utilize a display with fewer dots in some instances, which reduces costs.

The attached Appendix provides exemplary C code, which can be used for implementing the methods disclosed herein. The attached code, however, can be translated for any other appropriate executable programming language to implement the techniques described herein. Additionally, the attached code is subject to copyright protection in which the copyright owner reserves all copyrights contained therein.

Although the present invention has been described with reference to example embodiments, persons skilled in the art will recognize that changes may be made in form and detail without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. Because the technology of the present invention is relatively complex, not all changes in the technology are foreseeable. The present invention described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method for rendering an image for a staggered color graphics display, comprising:

(a) calculating a first color value based on a portion of the image corresponding to a first dot;

(b) calculating a second color value based on a portion of the image corresponding to at least one dot adjacent to the first dot; and (c) calculating a rendered value from the first and second color values for display in the first dot;

wherein the at least one adjacent dot in step (b) comprises six dots surrounding the first dot;

wherein the six surrounding dots are immediately adjacent the first dot;

and further including obtaining an aggregate color value for the portion of the image corresponding to the six surrounding dots by summing individual color values.

2. The method of claim 1, wherein the second color value is obtained by applying a weighting coefficient to the aggregate color value.

3. The method of claim 2, wherein the weighting coefficient is approximately ⅙.

4. The method of claim 2, wherein the first color value is obtained by applying a weighting coefficient to an intensity value for the portion of the image corresponding to the first dot.

5. The method of claim 4, wherein the weighting coefficient is approximately ⅓.

6. A method for rendering an image for a staggered color graphics display, comprising:

(a) applying a first coefficient to a color value of a portion of the image corresponding to a first pixel to obtain a first value;

(b) applying a second coefficient to a color value of a portion of the image corresponding to at least one adjacent pixel to obtain a second value; and (c) calculating a rendered value for display in the first pixel based on the first and second values;

and wherein the second coefficient is approximately ⅙.

7. A method for rendering an image for a staggered color graphics display, comprising:

(a) applying a first coefficient to a color value of a portion of the image corresponding to a first pixel to obtain a first value;

(b) applying a second coefficient to a color value of a portion of the image corresponding to at least one adjacent pixel to obtain a second value: and (c) calculating a rendered value for display in the first pixel based on the first and second values;

wherein the at least one adjacent pixel comprises six pixels surrounding the first pixel;

and further including obtaining an aggregate color value for the portion of the image corresponding to the six surrounding pixels by summing color values associated with the six pixels.

8. The method of claim 7, wherein the second color value is obtained by multiplying by the second coefficient by the aggregate color value.

9. A device for rendering an image for a staggered color graphics display, comprising:

(a) means for calculating a first color value based on a portion of the image corresponding to a first dot;

(b) means for calculating a second color value based on a portion of the image corresponding to at least one dot adjacent to the first dot; and (c) means for calculating a rendered value from the first and second color values for display in the first dot;

wherein means (a) includes applying a first coefficient to an intensity value for the portion of the image corresponding to the first dot;

wherein means (b) includes applying a second coefficient to an intensity value for the portion of the image corresponding to the at least one adjacent dot;

and wherein the second coefficient is approximately ⅙.

10. A device for rendering an image for a staggered color graphics display, comprising:

(a) means for calculating a first color value based on a portion of the image corresponding to a first dot;

(b) means for calculating a second color value based on a portion of the image corresponding to at least one dot adjacent to the first dot; and (c) means for calculating a rendered value from the first and second color values for display in the first dot;

wherein the at least one adjacent pixel comprises six dots surrounding the first dot;

and wherein means (b) includes obtaining an aggregate color value for the portion of the image corresponding to the six surrounding dots by summing color values associated with the six dots.

11. The device of claim 10, wherein the second color value is obtained by applying a weighting coefficient to the aggregate color value.

12. The device of claim 11, wherein the weighting coefficient is approximately ⅙.

13. The device of claim 11, wherein the first color value is obtained by applying a weighting coefficient to an intensity value for the portion of the image corresponding to the first dot.

14. The device of claim 13, wherein the weighting coefficient is approximately ⅓.

* * * * *

UNITED STATES PATENT AND TRADEMARK OFFICE

CERTIFICATE OF CORRECTION

PATENT NO. : 7,148,901 B2 
APPLICATION NO. : 10/848915
DATED : December 12, 2006
INVENTOR(S) : Stephane G. Belmon et al.

It is certified that error appears in the above-identified patent and that said Letters Patent is hereby corrected as shown below:

In column 7, line 32, in Claim 7, after “value” delete “:” and insert -- ; --, therefor.

Signed and Sealed this

Ninth Day of December, 2008

JON W. DUDAS
*Director of the United States Patent and Trademark Office*